United States Patent
Bertoni

(10) Patent No.: US 6,176,491 B1
(45) Date of Patent: Jan. 23, 2001

(54) SEALING DEVICE

(75) Inventor: Giovanni Bertoni, Copparo (IT)

(73) Assignee: Berco S.p.A., Copparo (IT)

( * ) Notice: Under 35 U.S.C. 154(b), the term of this patent shall be extended for 0 days.

(21) Appl. No.: 09/295,448

(22) Filed: Apr. 23, 1999

(30) Foreign Application Priority Data

Apr. 28, 1998 (IT) .............................................. MI98A0905

(51) Int. Cl.⁷ ...................................................... F16J 15/16
(52) U.S. Cl. .......................... 277/345; 277/380; 277/390; 277/399; 305/100
(58) Field of Search .................................... 277/345, 358, 277/370, 377, 390, 399, 380, 382, 394, 392, 393; 305/100, 185

(56) References Cited

U.S. PATENT DOCUMENTS

| | | |
|---|---|---|
| 3,272,519 | * 9/1966 | Voitik . |
| 3,826,506 | * 7/1974 | Eckert . |
| 4,094,514 | * 6/1978 | Johnson . |
| 4,111,436 | * 9/1978 | Yazawa . |
| 4,421,327 | * 12/1983 | Morley et al. . |
| 4,436,315 | 3/1984 | Hatch et al. . |
| 5,899,459 | * 5/1999 | Watts . |

FOREIGN PATENT DOCUMENTS

| | | |
|---|---|---|
| 0 408 117 | 1/1991 | (EP) . |
| 63-162382 | 7/1988 | (JP) . |

* cited by examiner

Primary Examiner—Terry Lee Melius
Assistant Examiner—William L. Miller
(74) Attorney, Agent, or Firm—Oblon, Spivak, McClelland, Maier & Neustadt, P.C.

(57) ABSTRACT

In order to ensure that the working life of the sealing device is at least comparable to that of the remaining parts of the crawler track, the resilient annular element comprises a first annular portion and a second annular portion. The first annular portion has a cross-section in the form of a bulge, while the second annular portion has a cross-section in the form of a boss. The first annular portion is delimited by an annular contact surface which, when the annular seal is assembled, but not mounted in its seat, forms together with the incident joining plane of the rigid annular sealing element, an angle "α" of between 0° and 30°.

14 Claims, 2 Drawing Sheets

SEALING DEVICE

BACKGROUND OF THE INVENTION

1. Field of the Invention

The present invention relates to a sealing device for achieving the lifelong lubrication of the moving parts of the various joints in a crawler track for earthmoving vehicles and the like, and for ensuring that the life of said device is comparable to that of the other components of the crawler track itself.

2. Discussion of the Background

As is known, the life of the crawler tracks of an earthmoving machine, both for civil or military use, is in practice determined by the degree of wear of the pins and/or the bushes which make up said crawler track.

When this wear has reached values which are no longer acceptable, it is necessary to perform an overhaul which requires the replacement of the worn parts, this operation unfortunately involving the disassembly of the entire crawler track or of every joint or every sealing device since all the joints (without exception) must be restored to their original dimensions. In view of the weight and the dimensions of the two crawler tracks of each machine and the specific equipment necessary for disassembly (such as, for example, at least one press of a suitable type), the operation may be performed in practice only in specialized workshops to where the machine or at least the two crawler tracks must be taken. In order to illustrate more fully the complexity of said operation, it should be considered that, after the cost of the fuel, depreciation of the crawler tracks, adding together the costs for maintenance and periodic replacement thereof, represents the largest item of expenditure in the running costs.

It goes without saying that the sealing devices, since they are components which are intended to prevent the penetration of abrasive foreign bodies into the joints and, if necessary, ensure that lubricant remains inside the latter, are of fundamental importance for the life of the crawler track. In practice, the penetration of foreign bodies into a joint results in wear of the surfaces in relative motion, including those of the sealing device. The effect of this is that the sealing device is increasingly less able to prevent the leakage of lubricant from the joint and the penetration of further abrasive foreign bodies between the surfaces in relative motion. This explains the reason why, in most cases, the wear, once it has started, subsequently develops in a relatively fast and increasingly rapid manner. In an attempt to find a solution to the abovementioned technical problem, the known art comprises various sealing devices, including also that described in Italian patent No. 1,230,329 filed on Jul. 11, 1989, compared to which the sealing device according to the invention may be regarded as a step forward. In order to facilitate understanding of the invention, reference numbers consistent with those in the abovementioned Italian patent have therefore been used in the description which follows.

SUMMARY OF THE INVENTION

The object of the present invention is therefore that of providing an improved sealing device so as to increase as far as possible its resistance to wear and consequently the working life of the corresponding crawler track, independently of the structure of the joint with which it is associated, i.e. independently of the fact whether the crawler track is of the type with fixed or rotating bushes.

These objects are achieved by a sealing device operating between the moving parts of an earth-moving vehicle.

The experience gained hitherto has demonstrated that the objective has been achieved, although in view of the fact that the wear of crawler track joints (in the widest sense of the term) is due to the random and more or less simultaneous presence of several causes, it is difficult to explain in scientifically detailed terms why it is considered that said objective has been achieved, despite the fact, as is well-known and certain, it will never be possible to eliminate said wear entirely. It should merely be considered that the wear may depend or depends, for example, on the material with which the device comes into contact (type of soil, whether clay-containing or not, wet or dry, impregnated with or free from pollutants, corrosive chemicals, etc.), the temperature of the environment, the type of operation (continuous or intermittent), accidental impacts and interaction, tolerances (both during assembly and during construction), downtime, etc.

BRIEF DESCRIPTION OF THE DRAWINGS

The invention is illustrated, purely by way of a nonlimiting example, in the accompanying drawings, in which.

DESCRIPTION OF THE PREFERRED EMBODIMENTS

Figure 1:
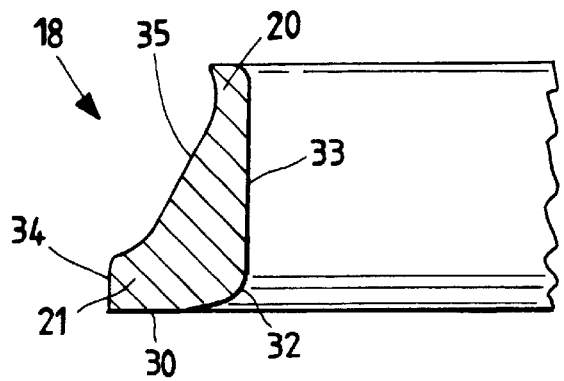
FIG. 1 shows a partial cross-sectional view of a first annular element.
Figure 2:
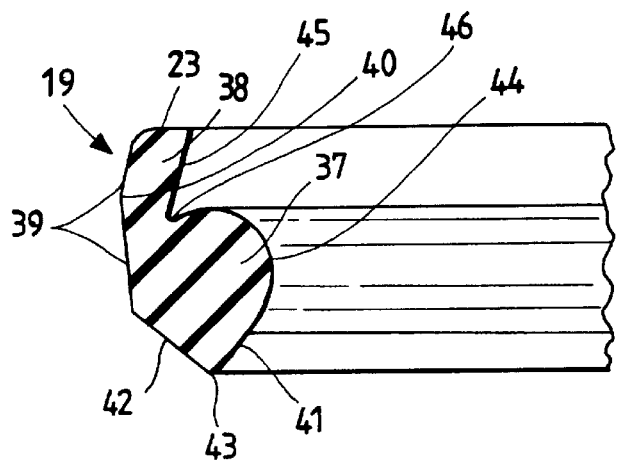
FIG. 2 shows a partial cross-sectional view of a second annular element.
Figure 3:
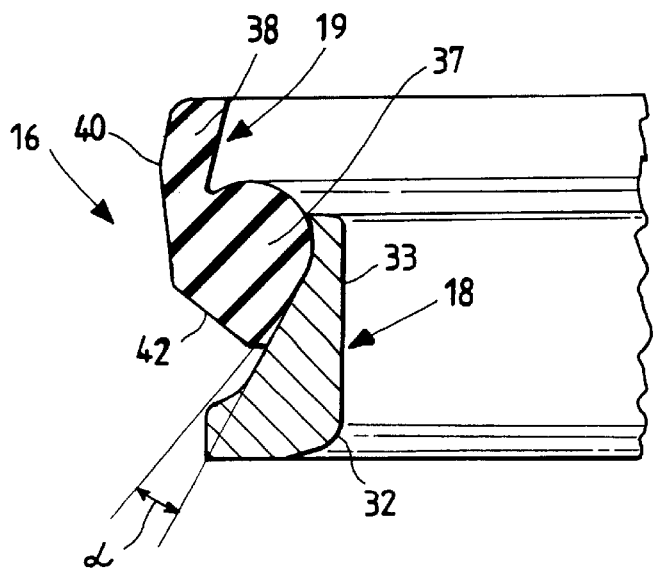
FIG. 3 shows a partial cross-sectional view of the first and the second annular element in the assembled state, or of the annular seal.
Figure 4:
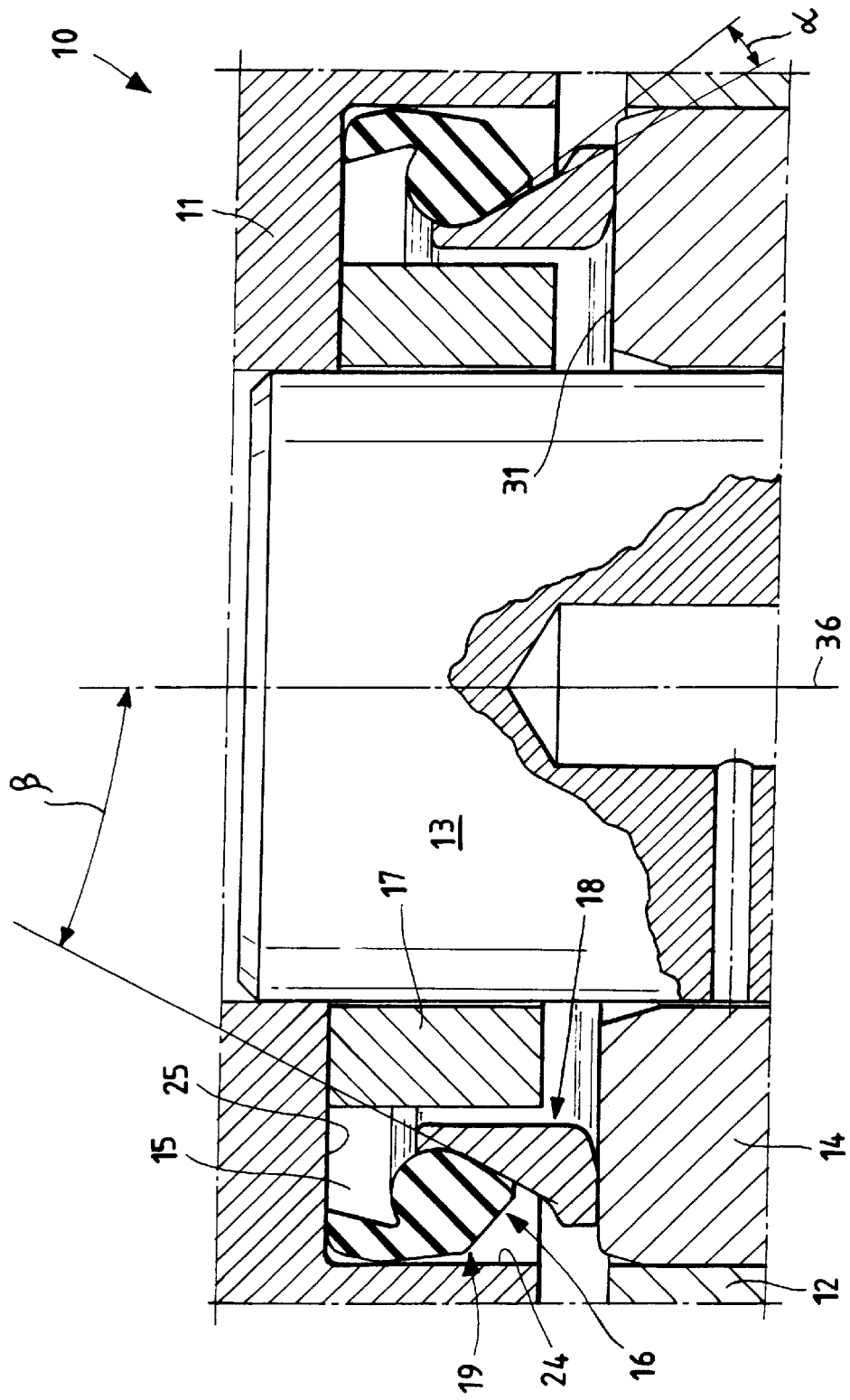
FIG. 4 shows the annular seal during assembly in its seat.

With reference to the abovementioned figures, the sealing device according to the invention is mounted in an articulated joint, for example for tracked vehicles, which is generally denoted by 10. The sealing device therefore operates between the moving mechanical parts 11, 12, 14 of a crawler track for earth-moving vehicles in which two of said mechanical parts 11, 14 and a pin 13, which connects them together for being rotatable about its axis 36, define an annular chamber 15 for the distribution, in the sealing zone, of the lubricant which is mainly contained in an axial cavity specially formed by means of a bore of suitable diameter in the pin 13 and distributed in the various areas of contact between the bush 14 and the pin 13 by means of special radial bores of a suitable size also formed in the pin 13, so as to be able to connect the axial cavity and the external cylindrical surface of said pin. The annular chamber 15 is delimited by an axial sealing surface 24 and a radial sealing surface 25. An annular seal 16 and a spacer element 17 for the mechanical parts 11, 14 are coaxially housed inside the chamber 15. The annular seal 16 surrounds the spacer element 17 which in turn surrounds the pin 13. The annular seal 16 is composed of an annular sealing element 18 and a resilient annular element 19. The annular sealing element 18 (see FIG. 1) has a substantially cylindrical portion 20 to which a substantially radial portion 21 is joined so as to form a substantially J-shaped or L-shaped cross-section delimited on one side by a substantially conical inclined surface 32. The resilient annular element 19 comprises an external radial surface 23 which matches the radial sealing surface 25 of the chamber 15 and externally embraces the annular sealing element 18. The resilient annular element 19 is designed to press the annular sealing element 18, in the sealed position, against a radial sealing surface 31 of one of the two mechanical parts 11, 14 joined together.

The substantially cylindrical portion 20 of the annular sealing element 18 is delimited by an internal cylindrical surface 33. It also has a substantially radial portion 21 which is intended to provide a sealing action, being made of material with a high hardness factor and delimited by a cylindrical surface 34 extending at right angles. The annular sealing element 18 also has a sealing surface 30 which comprises a sealing portion or band which is the front surface part of the rigid annular sealing element 18 against which the pressure necessary for the seal actually bears, preventing at the same time both the leakage of lubricant and the penetration of external contaminants, making frictional contact against the front surface of the bush 14.

The sealing band is a circular rim which, for a nominal diameter of about 60 mm, has a thickness of between 1.5 and 2.00 mm. The thickness of the sealing band has dimensions determined mainly on the basis of considerations of a tribological nature. The surface roughness of the sealing band for materials of the metallic type, for example is 0.005±0.003. The material used to make the annular sealing element 18 may be metallic or ceramic or composite synthetic or also of another nature. In any case it is important that said material should be rustproof so as to withstand chemical attack and have a suitable mechanical rigidity. In the case where it is metallic, good results have been obtained using a high-alloy cast iron based on chromium, molybdenum and vanadium with, for example, the following indicative chemical composition: 3.5% carbon, 1% silicon, 1.00% manganese, 15% chromium, 2% molybdenum, 1% vanadium. This cast iron has good rust resistance characteristics and, following heat treatment, reaches a hardness factor of more than 65 HRC.

The substantially cylindrical portion 20 of the annular sealing element 18 is joined to the substantially radial portion 21 along a joining plane 35 incident upon the axis 36 or the pin 13.

The resilient annular element 19 comprises a first annular portion having a cross-section in the form of a bulge 37 and second annular portion having a cross-section in the form of a boss 38. The first annular portion 37 is delimited by an annular contact surface 41 which, when the annular seal 16 is assembled, forms together with the incident joining plane 35 an angle "α" of between 0° and 30°. The incident joining plane 35 forms an angle "β" of between 22° and 38° with the pivoting axis 36.

The second annular portion 38 comprises a first pair of externally incident planes 39 forming a first cusp 40 having a diameter greater than the internal diameter of the annular chamber 15 or its axial sealing surface 24. In this way, during assembly of the articulated joint 10 and therefore the device according to the invention (which is performed by vertically positioning the parts 11, 12 to be connected together), the resilient annular element 19 is able to remain inside the annular chamber 15, overcoming the force of gravity. The first annular portion 37 comprises a second annular surface 42 with a flat cross-sectional shape incident upon the first annular surface 41 so as to form a second cusp 43 which is intended to be directed towards the outside of the annular chamber 15.

The first annular portion 37 comprises a third annular surface 44 with a circular cross-sectional shape incident upon a fourth flat annular surface 45 belonging to the second annular portion 38 so as to delimit a recess 46 intended to be directed towards the inside of the annular chamber 15. The material from which the resilient annular element 19 is made is an elastomer which is chemically resistant to lubricants and to water and has a high abrasion resistance and tearing strength with low permanent set values.

Good results have been obtained with elastomeric mixtures of the nitrilic type with a hardness factor of between 55 and 75 Shore "A". It is also possible to use silicone-containing mixtures or an elastomer commonly known as "Viton" or the like, depending on the different conditions of use. As can be noted, the device described here differs from the known device in that the elements indicated by the reference numbers 22, 26, 27, 28 and 29 in the preceding italian patent are no longer present or, if comparable, have a different form. Assembly of the sealing device (understood as being the combined arrangement of the annular seal 16 inserted in its seat 15 and the spacer element 17) is performed at the same time as assembly of the articulated joint 10 using a suitable press which simultaneously causes engagement of the pin 13 with the mechanical part 11 and the bush 14 with the mechanical part 12, thus resulting, during the final stage of said assembly, in axial compression of the sealing device by the front surface of the bush 14 as far as a point determined by the spacer ring 17. In the case where the annular sealing element 18 is of the metallic type, the axial thrust developed by the device at the end of the assembly operation described substantially depends in general on the nature of the prechosen materials.

This thrust is transmitted onto the sealing surface of the bush 14. In the case where the annular sealing element 18 is of the metallic type, the axial thrust developed by the device during assembly is, for example, 200 kg. During the course of the assembly operation, the resilient annular element 19 is gradually deformed. In particular, the second annular portion with a cross-section in the form of a boss 38 flexes, rotating about the recess 46 so that the fourth flat annular surface 45 is compressed against the third annular surface 44.

In so doing, the resilient annular element 19 becomes properly seated, assuming the working position configuration and being deformed so that the surface 41 is arranged along the incident joining plane 35 of the rigid annular sealing element 18.

During the overall movement of rotation and deformation due to compression of the resilient annular element 19, the angle "α" which is initially present between the annular surface 41 of the resilient ring 19 and the incident joining plane 35 of the rigid sealing element 18 gradually decreases until it is entirely eliminated during the end stage of assembly of the joint, carried out in the manner described above. In order to ensure the functionality and the working life of the sealing device in question, it is clearly of fundamental importance that the value of the thrusts (both radial and axial) which develop under working conditions should remain stably within the design parameters and also that they should be affected as little as possible by the variations (with respect to said parameters) resulting from inevitable dimensional tolerances occurring during manufacture of the various mechanical parts which form the joint. This may be achieved to a greater or less extent on the basis of the form of the load diagram, understood as being the graph showing the thrust exerted as a function of the compressive movement of the device, once inserted in the seat.

The smaller the variation in the thrust values when there is a variation in the compression imparted to the device, the greater the possibility of ensuring, under all conditions, that the working parameters remain close to the optimum values. An effective way of modifying the form of the abovementioned load diagram has been found to be that of shaping, in forms suitable for the purpose, the cross-sections of the two rings, i.e. the resilient ring 19 and the rigid ring 18, and in this connection particular importance is assumed by the value given at the design stage to the angle "α" described above. Said angle "α" therefore constitutes a design parameter which is of extreme importance for determining the end performance of the device.

Secondarily, by reducing the sensitivity of the sealing device to the dimensional variations in the seat inside which it must operate, it is possible to form said seats with much greater constructional tolerances, resulting in a significant cost-related benefit during production of the mechanical parts 11, 14, 17, 12. In view of the large quantity of said parts which are required for manufacture of a track belt, the overall cost-related benefit achieved is certainly of a significant nature.

What is claimed is:

1. A sealing device comprising:
   mechanical parts;
   a pin having a pivoting axis, said pin connecting two of said mechanical parts wherein said pin connects said mechanical parts so as to be pivotable about the pivoting axis of said pin and to form an annular chamber for a lubricant which is delimited by an axial sealing surface and a radial sealing surface of one of said mechanical parts; an annular seal and a spacer element for the mechanical parts which are coaxially housed in said chamber; the annular seal surrounding the spacer element and said spacer element surrounding the pin;
   the annular seal comprising a rigid annular sealing element and a resilient annular element, the annular sealing element having a substantially radial portion and a substantially cylindrical portion to which said substantially radial portion is joined so as to form a substantially J-shaped or L-shaped cross-section delimited internally by a substantially conical inclined surface;
   the resilient annular element comprising an external radial surface which engages the radial sealing surface of the chamber and externally engages the annular sealing element; said resilient annular element pressing the annular sealing element, in a sealed position, against a radial sealing surface of said one of the two mechanical parts, the substantially cylindrical portion of the annular sealing element being delimited by an internal cylindrical surface of said annular sealing element;
   the substantially radial portion of the annular sealing element provides a sealing action, comprising a material having a predetermined hardness factor, said substantially radial portion being delimited externally by a cylindrical surface extending at right angles and having at a front portion thereof at least one sealing surface;
   said substantially cylindrical portion of said annular sealing element being joined to said substantially radial portion along a joining plane disposed at an angle with respect to the axis of said pin;
   said resilient annular element comprising a first annular portion having a cross-section in the form of a bulge and a second annular portion having a cross-section in the form of a boss, in which the first annular portion is delimited by a first annular contact surface which, when said annular seal is assembled, forms with respect to the incident joining plane an angle of between 0° and 30°.

2. Device according to claim 1, wherein said incident joining plane forms an angle of between 22° and 38° with said pivoting axis of said pin.

3. Device according to claim 1, wherein the second annular portion comprises a first pair of externally incident planes forming a first cusp having a diameter greater than an internal diameter of the annular chamber or said axial sealing surface.

4. Device according to claim 1, wherein the first annular portion comprises a second annular surface with a flat cross-sectional shape incident upon said first annular contact surface so as to form a second cusp for being directed towards an outside portion of the annular chamber.

5. Device according to claim 1, wherein the second annular portion has a substantially flat annular surface and the first annular portion comprises a third annular surface with a circular cross-sectional shape incident upon the substantially flat annular surface of the second annular portion so as to delimit a recess directed towards an inside portion of the annular chamber.

6. Device according to claim 1, wherein, said at least one sealing surface of said annular sealing element comprises a sealing band or portion which comprises a front surface part of said rigid annular sealing element against which a pressure force necessary for sealing actually bears and which makes frictional contact against a front surface of said moving mechanical parts.

7. Device according to claim 6, wherein the sealing band comprises a circular rim which, for a nominal diameter of about 60 mm, has a thickness of between 1.5 and 2.00 mm.

8. Device according to claim 7, wherein the surface roughness of the sealing band, in the case of metallic materials, is 0.005±0.003.

9. Device according to claim 1, wherein the material used to make the annular sealing element is metallic or ceramic or synthetic or composite.

10. Device according to claim 1, wherein the material used to make the annular sealing element is rust-proof.

11. Device according to claim 1, wherein the material used to make the annular sealing element is a high-alloy cast iron which comprises chromium, molybdenum, vanadium with a composition of 3.5% carbon, 1% silicon, 1.00% manganese, 15% chromium, 2% molybdenum, 1% vanadium and which, following heat treatment, has a hardness factor of more than 65 HRC and has a predetermined degree of rust resistance.

12. Device according to claim 1, wherein the material used to make the resilient annular element comprises an elastomer chemically resistant to lubricants and to water and which has a predetermined abrasion resistance and tearing strength .

13. Device according to claim 12, wherein the material used for making the resilient annular element consists of nitrilic elastomeric mixtures with a Shore hardness factor of between 55 and 75.

14. Device according to claim 12, wherein the material used for making the resilient annular element comprises a mixture containing silicone or an elastomer.

* * * * *